Sept. 26, 1944. C. F. RUBSAM 2,359,248
COUNTERBALANCING MEANS FOR AUTOMOBILE WHEELS
Filed March 26, 1942
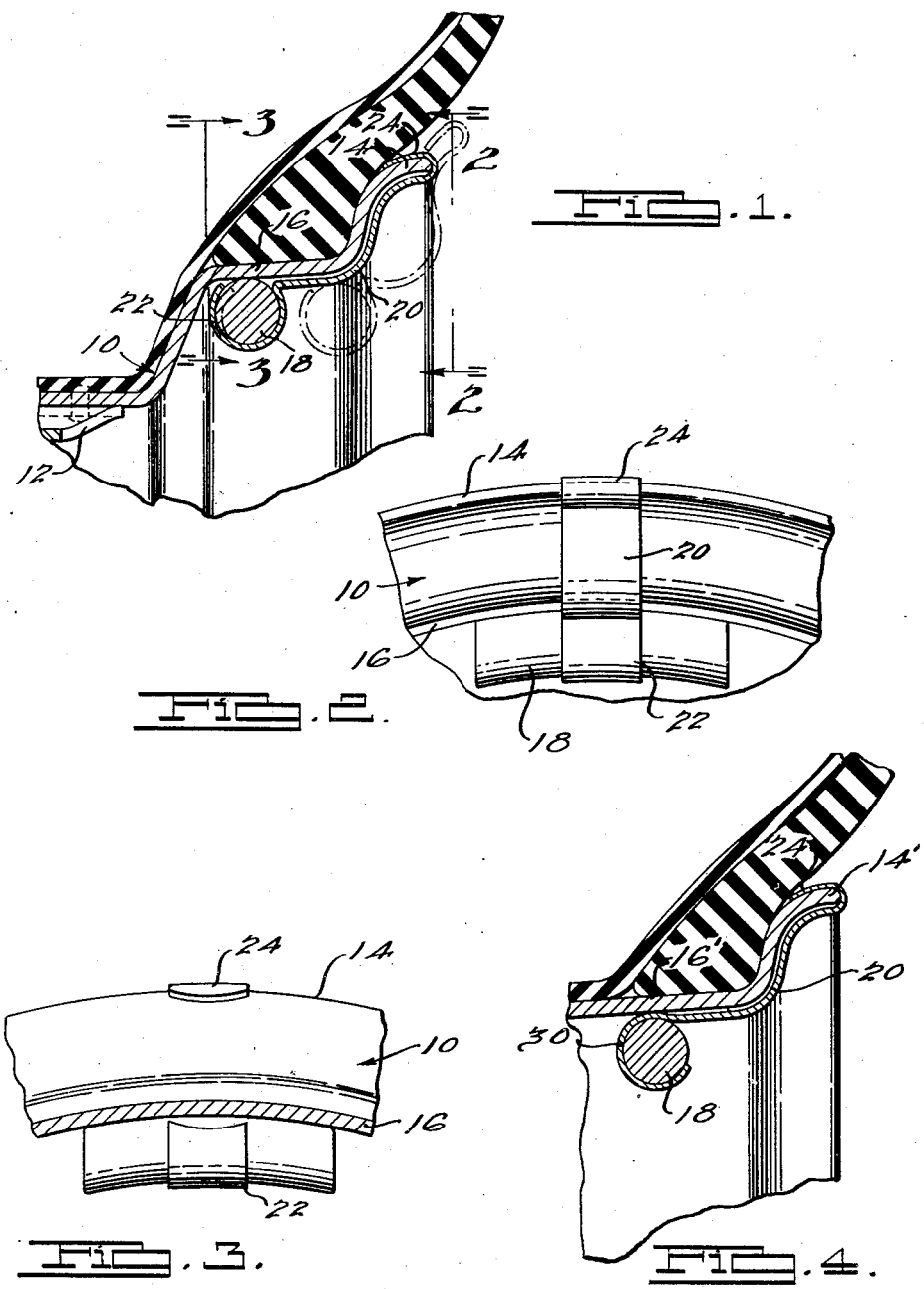
INVENTOR
Charles F. Rubsam.
BY
Harness, Dickey & Pierce
ATTORNEYS.

Patented Sept. 26, 1944

2,359,248

UNITED STATES PATENT OFFICE 2,359,248

COUNTERBALANCING MEANS FOR AUTOMOBILE WHEELS

Charles F. Rubsam, Tenafly, N. J.

Application March 26, 1942, Serial No. 436,272

5 Claims. (Cl. 301—5)

The present invention relates to balancing counterweights for automobile wheels.

One of the primary objects of the present invention is to provide an improved construction of the type mentioned above in which the counterweight is placed closer to the center line of the tire and rim, as compared to those prior constructions in which the weights are attached below the outwardly flared rim flange.

Another object of the present invention is to provide improvements in structures of the type mentioned, in which the weight does not protrude beyond the edge of the rim flange, and therefore cannot be knocked off, or fly off under centrifugal force.

Another object of the present invention is to provide improvements in structures of the type mentioned, in which the proper securing of the counterweight to the rim itself is not dependent on tire pressure to hold it on because it is press fitted at the weight end of the clip, causing the hooked-on portion of the clip to clamp tightly at the tire side of the outward flare of the rim flange.

Another object of the present invention is to provide improvements in devices of the type mentioned, which are simple and economical, and which are adapted for practical use.

Other objects of the invention will become apparent from the following specification, the drawing relating thereto, and from the claims hereinafter set forth.

In the drawing, in which like numerals are used to designate like parts in the several views throughout:

Figure 1 is a fragmentary, cross-sectional view showing a portion of an automobile wheel rim having a counterweight according to the present invention attached thereto;

Fig. 2 is an elevational view taken substantially along line 2—2 of Fig. 1;

Fig. 3 is an elevational and cross-sectional view taken substantially along line 3—3 of Fig. 1; and Fig. 4 is a view similar to that shown in Fig. 1, illustrating a modified form of the present invention, in combination with a flat base rim.

The embodiments and exemplifications of wheel balancing counterweights disclosed in the present application are outgrowths of applicant's previous developments in the same field, as shown by United States Letters Patent Nos. 2,137,415, 2,137,416, and 2,329,854.

Referring to the drawing, and referring particularly to Figs. 1 to 3, an automobile wheel of modern design is partially illustrated, which comprises a drop center rim generally indicated at 10. Portions of the inflated tire and tube are illustrated to show their relationship with the rim. Such rim 10 is secured to the flanges 12 at the radial outer extremities at or near the center or spoke portion of the wheel body in the usual way. The rim 10 is provided with the usual outwardly flared annular tire retaining flange 14 at each side. The rim is also formed with an intermediate rim base portion 16 which is annularly formed, at each side.

A counterweight assembly, including a counterweight 18 and a spring clip 20, is provided for attachment to the rim 10 in the manner to be hereinafter described. The counterweight 18 is secured to the clip 20 prior to its installation on the rim so that the weight and clip may be applied as a unit. The clip 20 is formed of a resilient or spring metal strip, and one end thereof is contracted around the weight 18, as indicated at 22, and is sprung open to receive the weight therein. The end then springs shut to secure such weight to the clip 20. The clip 20 is generally transversely flat, and the opposite end thereof is hooked over the tire side of the flange 14, as indicated at 24. Such hooked over portion 24 is shaped to follow the contour of that portion of the flange 14 so that it engages the flange both radially and annularly. The radial shaping is best shown in Fig. 1, and the annular shaping is best shown in Figs. 2 and 3. This shape stiffens the lips of the spring clip as it hooks over the flange 14. The clip also generally follows the contour of the flange longitudinally of the clip which also contributes to the resilient urging of the weight against the rim base portion.

The weight 18 in the embodiment illustrated is generally circular in cross section, and such weight is generally in the form of an elongated cylinder which is longitudinally bent to follow the contour of the inner surface of the rim base 16 against which it is adapted to bear. The weight 18 could have a different shape and may be oval or of any other suitable shape.

The clip and the weight form a unit, and when applying the unit to the rim, it will be seen by reference to Fig. 1 that the end of the lip is hooked on the tire side of the flared rim flange. As this lip is forced downwardly along the tire side of the flange, the clip must be expanded, from the configuration shown in broken lines to a maximum position (not shown) and then it contracts to that shown in full lines, so as to permit the other end, holding the weight body, to slip along the outer side of the rim toward and below the rim base 16. The extreme expansion occurs after the weight end of the clip contacts the curve, at the bottom of the flared flange, i. e., the juncture of the rim base and flange. The expansion lessens from then on, although the pressure at the base 16 continues to exist. This spring pressure holds the weight in position, as shown in full lines in Fig. 1. The increase in the expansion of the clip which would occur in taking the weight off the flared rim flange, prevents its dislocation. This increase in the expansion of the clip is bound to occur also if the hooked on lip would travel upwardly along the tire side of the flared rim flange. This movement would increase the pressure against the base 16. Once applied, the clip could not, for these reasons, travel in the reverse way, without being intentionally forced outward by means of a tool.

In Fig. 4, a modified form of the present invention is illustrated in which the weight 18 is secured to the clip 20 in a slightly different manner. The counterweight unit is shown here as applied to a conventional flat rim rather than the drop center rim shown above. This rim has an annular base portion 16' and a flared flange 14'. In this embodiment the end 30, which corresponds to the end 22 in the embodiment above described, is reversely turned and contracted so that it is sprung apart to receive the counterweight 18 to thereby hold such counterweight to the clip. The structure is otherwise the same as that described above. The clip 20 is so formed that it is offset in the same relation as that shown by the broken and full lines in Fig. 1, so that the inner end portion 30 and the weight 18 are resiliently urged toward the rim portion 16' and the hooked end is thus firmly held in place.

What is claimed is:

1. Balancing means for an automobile wheel having a rim provided with an outwardly flared annular flange portion and an annular rim base portion, the juncture of said portions being curved in cross section, comprising a spring clip having an end porton adapted to hook over said annular flange, a counterweight fixed to the opposite end of said clip to form a unit, the intermediate portion of said clip being shaped so as to have a sharper curvature than the curved juncture of the rim base and flange portions whereby the clip must be sprung to be applied, the length of said clip being such that the greatest amount of springing occurs as the counterweight is passed by the juncture of the rim base and flange portions, said clip being under tension when said counterweight is in final position inward from said juncture.

2. Balancing means for an automobile wheel having a rim provided with an outwardly flared annular flange portion and an annular rim base portion, comprising a spring clip having an end portion shaped and adapted to hook over said annular flange, a counterweight fixed to the opposite end of said clip to form a unit, the intermediate portion of said clip being curved to follow the cross-sectional contour of said flange portion and then curved inwardly, the length and shape of said clip being such that in final position the counterweight is located inwardly of said flange portion and in the plane of said annular rim base portion, said clip being sprung when applied and being under tension when said counterweight is in final position.

3. Balancing means for an automobile wheel having a rim provided with an outwardly flared annular flange portion and an annular rim base portion, comprising a spring clip having an end portion shaped and adapted to hook over said annular flange, a counterweight fixed to the opposite end of said clip to form a unit, the intermediate portion of said clip being curved to follow the cross-sectional contour of said flange portion and then curved inwardly, the respective cross-sectional shape of said rim and clip being such that said clip is expanded when applied and then partially contracts and remains under tension in final position.

4. Balancing means for an automobile wheel having a rim provided with an outwardly flared annular flange portion and an annular rim base portion, comprising a spring clip having an end portion shaped and adapted to hook over said annular flange, a counterweight fixed to the opposite end of said clip to form a unit, the intermediate portion of said clip being curved to follow the cross-sectional contour of said flange portion and then curved inwardly, said balancing means exerting a yielding force against said rim base portion when moved into final position and causing an increase of said force when said movement is reversed, whereby dislocation is prevented.

5. Balancing means for an automobile wheel having a rim provided with an outwardly flared annular flange portion and an annular rim base portion, comprising a spring clip having an end portion shaped and adapted to hook over said annular flange, a counterweight fixed to the opposite end of said clip to form a unit, the intermediate portion of said clip being curved to follow the cross-sectional contour of said flange portion and then curved inwardly, said spring clip being of such a configuration relative to said flange and rim base portions as to cause a pressure of said balancing means against said rim base portion when in final position and an increase in said pressure when moving from said position.

CHARLES F. RUBSAM.